United States Patent [19]

Oyama et al.

[11] Patent Number: 5,115,401
[45] Date of Patent: May 19, 1992

[54] METHOD FOR AUTOMATICALLY CORRECTING DEFLECTION OF STYLUS IN DIGITIZING DEVICE

[75] Inventors: Hiroshi Oyama; Takao Hasebe, both of Ooguchi, Japan

[73] Assignee: Kabushiki Kaisha Okuma Tekkosho, Aichi, Japan

[21] Appl. No.: 441,318

[22] Filed: Nov. 27, 1989

[30] Foreign Application Priority Data

Nov. 28, 1988 [JP] Japan .............................. 63-300048

[51] Int. Cl.$^5$ .......................... G06F 15/46; G01B 9/00
[52] U.S. Cl. .......................... 364/474.37; 364/474.03; 364/560
[58] Field of Search ...................... 364/474.03, 474.37, 364/560–562; 318/568.16, 569, 578, 571

[56] References Cited

U.S. PATENT DOCUMENTS

| | | | |
|---|---|---|---|
| 4,424,570 | 1/1984 | Imazeki et al. | 364/474.03 |
| 4,587,622 | 5/1986 | Herzog | 364/474.37 |
| 4,679,159 | 7/1987 | Yamazaki et al. | 364/474.03 |
| 4,939,678 | 7/1990 | Beckwith, Jr. | 364/474.37 |

Primary Examiner—Jerry Smith
Assistant Examiner—Jim Trammell
Attorney, Agent, or Firm—Wenderoth, Lind & Ponack

[57] ABSTRACT

The method for automatically correcting deflection of a stylus in a digitizing device enables correction of the displacement of the stylus. The coefficient of deflection correction is calculated by utilizing the fact that the displacement and deflection of the stylus are both in proportion to the contact pressure between the stylus and a three-dimensional model. A is a method for automatically correcting a deflection of a stylus in a digitizing device wherein the stylus held at a tracer head in the digitizing device is moved along surfaces of a three-dimensional model, and digitized data representing configuration of the three-dimensional model is calculated from the relative position between the three-dimensional model and the tracer head and the displacement of the stylus, includes the steps of moving the stylus in a direction of a predetermined axis relatively to the three-dimensional model, determining the relative position as a first relative position when a displacement of the stylus approximates a predetermined first displacement, determining the relative position as a second relative position when it approximates a predetermined second displacement, automatically obtaining a deflection correction coefficient of the stylus from the first and second displacements and the first and second relative positions, and automatically correcting the displacement of the stylus using the thus obtained deflection correction coefficient.

3 Claims, 3 Drawing Sheets

METHOD FOR AUTOMATICALLY CORRECTING DEFLECTION OF STYLUS IN DIGITIZING DEVICE

BACKGROUND OF THE INVENTION

The present invention relates to a method for automatically determining coefficients for correcting the deflection of a stylus in a digitizing device and automatically correcting a displacement of the stylus using the correction coefficients thus obtained.

In a digitizing device, digitized data which defines a three-dimensional model is generally determined from the path of the center of the stylus which is obtained by adding an output from a position detector for detecting the relative positions of a three-dimensional model and a tracer head and the output from the tracer head for measuring the amount of the displacement of the stylus. Accordingly, it is necessary to use a stylus having a diameter as small as is practically possible in order to obtain digitized data which are faithful to the form of the three-dimensional (3-D) model.

The stylus is held at the tracer head by means of a spring, and exhibits a displacement which is proportional to the contact pressure between the stylus and the three-dimensional model. For example, as shown in FIG. 1, the stylus ST is displaced by a displacement EX in response to the contact pressure F between the stylus ST and the three-dimensional model BK, as expressed by the following equation (1):

$$F = k_1 \cdot EX \qquad (1)$$

wherein $k_1$ is an elastic coefficient of a spring.

However, when the stylus ST having a small diameter such as shown in FIG. 2 is used to obtain digitized data which is as faithful as possible to the three-dimensional model configuration, the stylus ST sometimes deflects by the contact pressure F between it and the three-dimensional model BK because of the low rigidity of the stylus ST. The deflection amount TX in the stylus ST is proportional to the contact pressure F (refer to an equation (2) below):

$$F = k_2 \cdot TK \qquad (2)$$

wherein $k_2$ denotes an elastic coefficient of the stylus ST.

As a result, the precision of the digitized data becomes deteriorated since the deflection amount TX is added as an error to the normal displacement EX. In the prior art, the deflection amount of a small-diameter stylus is therefore determined on the basis of a large-diameter stylus in which the deflection is negligible, and the inputted displacement is corrected accordingly to achieve higher precision of the digitized data. However, this necessitates a precise determination of the deflection amount for each stylus used, thereby inconveniently requiring a relatively large amount of time expended.

SUMMARY OF THE INVENTION

The present invention was contrived to eliminate such defects encountered in the prior art, and aims to provide a method which is capable of correcting a displacement of a stylus in a digitizing device automatically in a short period of time.

According to one aspect of the present invention, for achieving the objects described above, there is provided a method for automatically correcting a deflection of a stylus in a digitizing device wherein the stylus held at a tracer head in the digitizing device is moved along surfaces of a three-dimensional model, and digitized data representing a configuration of the three-dimensional model is calculated from the relative position between said three-dimensional model and said tracer head and the displacement of said stylus, which comprises the steps of moving said stylus in a direction of a predetermined axis relatively to said three-dimensional model, determining the relative position as a first relative position when a displacement of said stylus approximates a predetermined first displacement, determining the relative position as a second relative position when it approximates a predetermined second displacement, automatically obtaining a deflection correction coefficient of said stylus from said first and second displacements and the first and second relative positions, and automatically correcting the displacement of said stylus using thus obtained deflection correction coefficient.

The nature, principle and utility of the invention will become more apparent from the following detailed description when read in conjunction with the accompanying drawings.

DESCRIPTION OF THE PREFERRED EMBODIMENT

Figure 3:
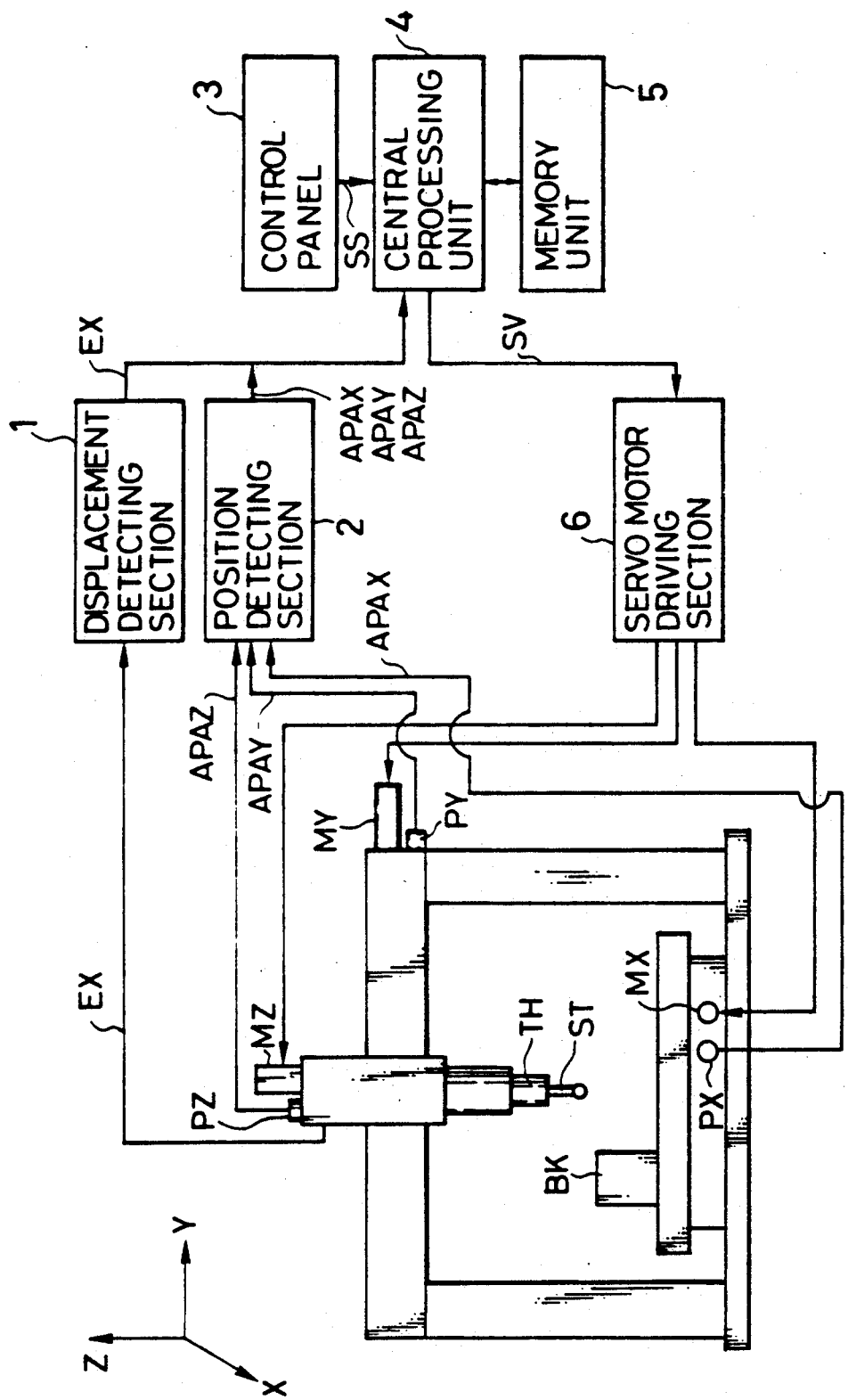
FIG. 3 is a block diagram showing one embodiment of a digitizing device by which the present automatic correction method for stylus deflection is realized.

FIG. 3 is a block diagram of a configuration of a digitizing device which realizes the method of correcting a deflection of a stylus according to the present invention. The movement of a tracer head TH in the directions of the Y- and Z-axes are controlled by servo motors MY and MZ. The respective positions thereof are detected by the position detectors PY and PZ. The relative movement of the tracer head TH in the direction of the X-axis is carried out by moving the three-dimensional model BK and is controlled by a servo motor MX. The position with respect to the X-axis is detected by a position detector PX. An analog signal representing the displacement EX of the stylus ST which is measured by the tracer head TH is inputted to a detecting section 1 for detecting the displacement of the tracer head TH and is converted into a digital signal. The position signals APAX, APAY, APAZ are detected by position detectors PX, PY and PZ respectively and inputted to a position detecting section 2. The digital signal representing the displacement EX of the stylus ST from the displacement detecting section 1, the position signals APAX, APAY and APAZ from the position detecting section 2, and an instruction SS from an operator via a control panel 3, are inputted to a central processing unit 4. The control steps and the control data are stored in a memory unit 5. Velocity command SV is inputted to a servo motor driving section 6 from the central processing unit 4 to control the servo motors MX, MY and MZ.

Figure 1:
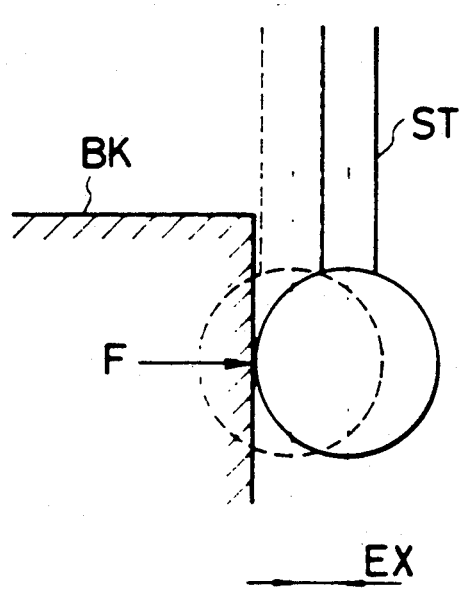
FIGS. 1 and 2 are plain views to explain the actions of a stylus.
Figure 2:
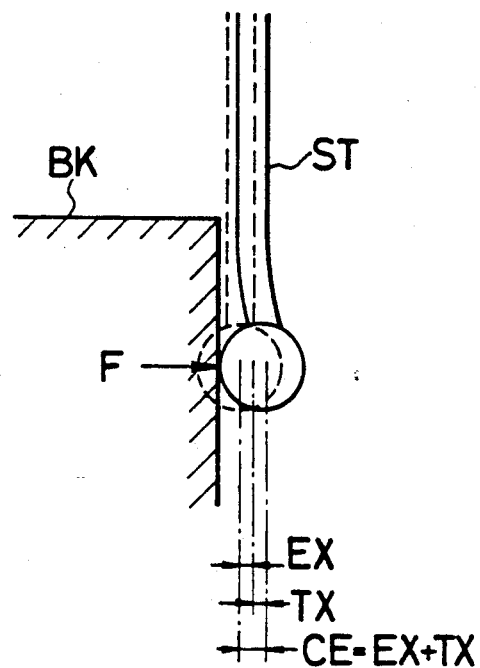
Figure 4:
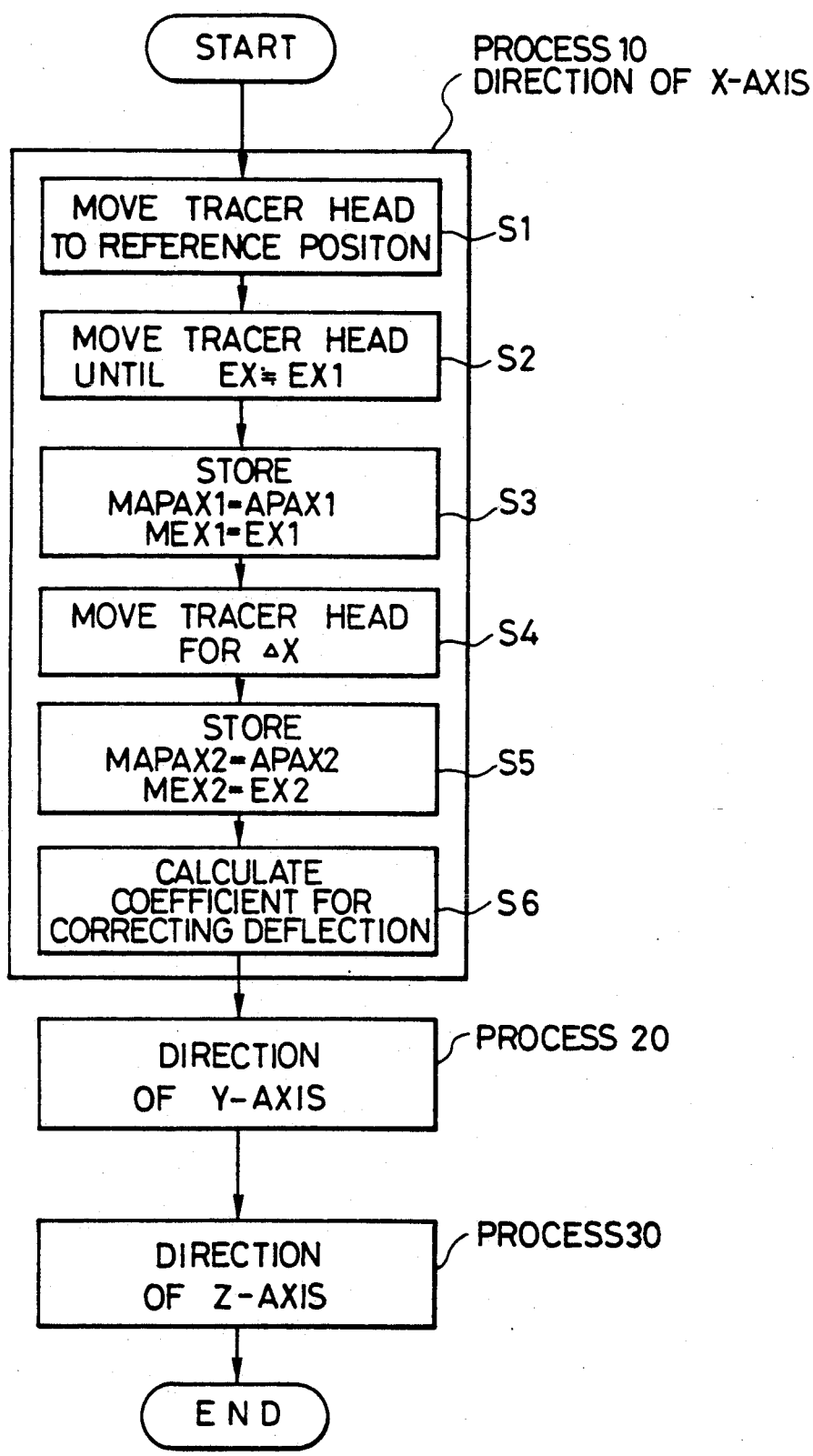
FIG. 4 is a flow chart showing one example of an operation of the digitizing device.

The operation of the digitizing device having the above construction will now be described referring to the flow chart shown in FIG. 4 and to FIG. 2. The central processing unit 4 transmits a velocity command SV to the servo motor driving section 6 in accordance with the instruction SS from the operator via the control panel 3. The servo motor driving section 6 moves the tracer head TH to a reference position (on the positive side of the three-dimensional model BK) by controlling the servo motors MX, MY and MZ (Step S1). The servo motor driving section 6 also moves the tracer head TH in the negative direction of the X-axis relative to the three-dimensional model BK until the displacement EX of the stylus ST in the direction of X-axis approximates a predetermined displacement EX1 (Step S2). The position signal APAX1 of the position detector PX and the displacement EX1 of the stylus ST at this time are stored in memory areas MAPAX1 and MEX1 in the memory unit 5 respectively (Step S3). The tracer head TH is moved by $\Delta X$ in the negative direction of the X-axis relative to the three-dimensional model BK (Step S4), and the position signal APAX2 of the position detector PX and the displacement EX2 (including the deflection amount TX) of the stylus ST at this moment are stored in memory areas MAPAX2 and MEX2 in the memory unit 5 respectively (Step S5).

The displacement CEX of the stylus ST at its center is expressed by the following equation (3)

$$CEX = EX + TX \qquad (3)$$

The equation (3) can also be expressed as follows (equation (4) below) using the equations (1) and (2) as above.

$$CEX = (1 + k_1/k_2)EX \qquad (4)$$

Thus, by multiplying the displacement EX of the stylus ST by $(1+k_1/k_2)$ as the coefficient for the correction, the deflection amount TX can be corrected and eliminated. In this example, the coefficient $(1+k_1/k_2)$ for deflection correction is expressed by the following equation (5) since it is given that $CEX = -(APAX2 - APAX1)$ and $EX = EX2 - EX1$ (Step S6).

$$\left(1 + \frac{k_1}{k_2}\right) = \frac{CEX}{EX} = \frac{-(APAX2 - APAX1)}{EX2 - EX1} \qquad (5)$$

In this manner, upon completion of the processings in the direction of the X-axis in the Process 10 (Steps 1 to 6), the same processings are repeated for the directions of the Y- and Z-axes (Process 20 and Process 30), to determine the coefficients of deflection correction in each axis, which are in turn stored in the memory unit 5 to complete all processings. Subsequent correction of the displacements in the stylus ST will be effected using the coefficients of correction thus stored.

The method for automatically correcting the displacement of a stylus in the digitizing device allows accurate correction of the stylus without involving manual operation and therefore improves the precision of digitized the data. It also enables automation of a digitizing device.

It should be understood that many modifications and adaptations of the invention will become apparent to those skilled in the art and it is intended that such obvious modifications and changes be encompassed in the scope of the claims appended hereto.

What is claimed is:

1. A method for automatically correcting a deflection of a stylus in a digitizing device wherein the stylus held at a tracer head in the digitizing device is moved along surfaces of a three-dimensional model, and digitized data representing a configuration of the three-dimensional model is calculated from the relative position between said three-dimensional model and said tracer head and the displacement of said stylus, said method comprising the steps of moving said stylus in a direction of a predetermined axis relative to said three-dimensional model, determining the relative position as a first relative position when a displacement of said stylus approximates a predetermined first displacement, determining the relative position as a second relative position when the displacement of said stylus approximates a predetermined second displacement, automatically obtaining a deflection correction coefficient of said stylus based on said first and second displacements and the first and second relative positions, and automatically correcting the displacement of said stylus using the thus obtained deflection correction coefficient, wherein said deflection correction coefficient is $(1+k_1/k_2)$, where $k_1$ is an elastic coefficient of a spring which holds said stylus in place and $k_2$ is an elastic coefficient of the stylus.

2. An automatic correction method as claimed in claim 1, wherein said correction is effected by multiplying the displacement of said stylus by said deflection correction coefficient.

3. An automatic correction method as claimed in claim 1, wherein the deflection correction coefficient in each axis is stored in a memory unit to be used in subsequent correction of displacements.

* * * * *